J. A. JOHNSON.
HARROW TOOTH FASTENER.
APPLICATION FILED OCT. 8, 1908.
924,993.
Patented June 15, 1909.
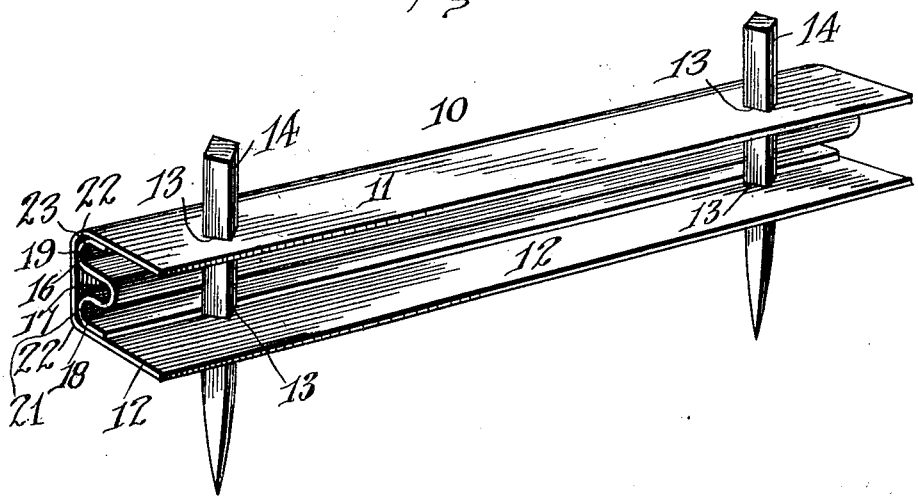
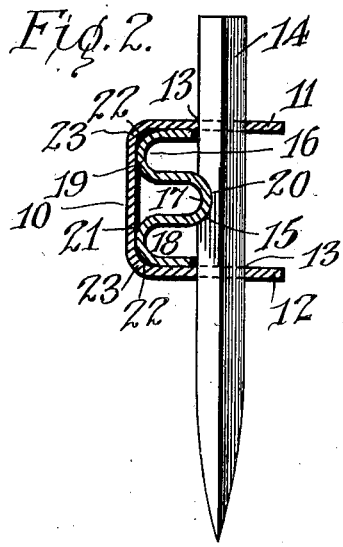
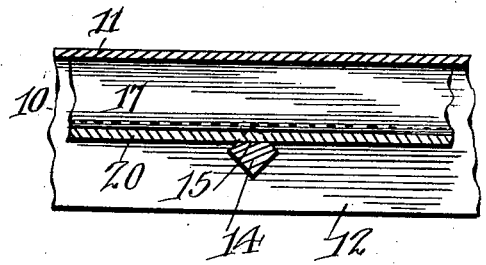
John A. Johnson, Inventor
Witnesses
Henry K. White
Irv. L. McCathran
By E. E. Vrooman,
his Attorney.

BEST AVAILABLE COPY

UNITED STATES PATENT OFFICE.

JOHN A. JOHNSON, OF PORTLAND, OREGON.

HARROW-TOOTH FASTENER.

No. 924,993.  Specification of Letters Patent.  Patented June 15, 1909.

Application filed October 8, 1908. Serial No. 456,733.

*To all whom it may concern:*

Be it known that I, JOHN A. JOHNSON, a citizen of the United States, residing at Portland, in the county of Multnomah and State of Oregon, have invented certain new and useful Improvements in Harrow-Tooth Fasteners, of which the following is a specification, reference being had therein to the accompanying drawing.

This invention relates to harrows, and has in view certain new and useful improvements in means for fastening the teeth in the tooth bar.

One of the principal objects of the invention is to provide a novel type of fastener which is adapted to be slipped in between the teeth and the back of the tooth bar and which is provided with projecting portions which have a binding engagement with the teeth to retain the latter in position.

With the above object in view the invention contemplates the employment of the usual U-shaped tooth bar which carries the teeth and with which coöperates a substantially W-shaped tooth fastener which is formed of resilient sheet metal adapted to have a binding engagement within said tooth bar and whose projecting portions have a binding engagement with the harrow teeth.

In carrying out the invention, changes in details may be resorted to but a preferred and practical embodiment of the same is shown in the accompanying drawings wherein—

Figure 1 is a perspective view of a tooth bar showing the tooth fastener therein. Fig. 2 is a vertical sectional view. Fig. 3 is a longitudinal sectional view.

Like characters of reference designate corresponding parts.

Referring to the accompanying drawings, 10 designates the tooth bar which is of the ordinary U-shape channeled structure providing the upper and lower flanges 11—12, through which the registering teeth openings 13 are formed, said openings in this instance being in the shape of a diamond to receive similarly shaped teeth 14 the ends of which are pointed. Preferably the teeth are of such a relative size to their openings in the tooth bar that a tight fit is obtained, and at a point on their body, which is within the tooth bar, said teeth are provided with a notch 15 on their rear face, said notch being preferably rounded at its bottom, the function of which will presently appear.

The tooth fastener employed in connection with the tooth bar and teeth above described, is of a substantially W-shape, which provides an upper rearwardly projecting loop 16; an intermediate forwardly projecting loop 17, and a bottom loop 18, which projects rearwardly. Said fastener is of a size to permit of its being slipped within the tooth bar and is formed of resilient metal which allows of the same being compressed so that it may be freely passed into its tooth-holding position within the tooth bar. It will be observed that the formation of the three loops in the fastener is such that rounded ends of each are provided, as designated by the numerals 19, 20 and 21, respectively, the rounded ends 19 and 21 being adapted for a snug fit within the upper and lower rounded corners 22—23 of the upper and lower flanges 11 and 12 of the tooth bar, and the rounded end 20 of the intermediate loop 17 is adapted to have a snug fit within the rounded holding notch formed in the body of the teeth.

In assembling the parts of the invention described above, the teeth 14 are forced through their openings formed in the tooth bar, with their holding notches facing the interior of said bar. The fastener is then slightly compressed to permit of its free entrance into the holding bar with its upper and lower loops projecting rearwardly and its intermediate loop projecting forwardly, which causes said first mentioned loops to be in a position to engage with the rounded upper and lower corners of the tooth holding bar, and the intermediate loop to have its rounded end enter the holding notches in the teeth. As the said fastener is forced into its tooth-engaging position, the pressure thereon is released, whereupon said fastener, owing to its resilience, will expand, causing its upper loop and lower loop to have a tight, binding engagement with the upper and lower flanges and rear wall of the tooth bar, and its intermediate loop to have a tight, binding engagement within the holding notches in the teeth.

From the foregoing description it will be seen that the described fastener is one that may be readily placed in its tooth-holding position, and when in such position the teeth will be held in a fixed position relative to their holding bar. It will also be observed that a reversal of the operation of driving the fastener to its tooth-holding position, will readily dismantle the tooth bar structure.

Claims:—

1. A harrow tooth fastener comprising a tooth bar provided with a tooth opening, a tooth fitting said opening and provided with a holding notch, and a resilient tooth fastener fitting said tooth bar and having a binding engagement therein and also having a binding engagement with the holding notch of said tooth.

2. A harrow tooth fastener comprising a tooth bar of channeled formation and provided with a tooth opening, a tooth fitting said opening and provided with a holding notch, and a resilient fastener provided with a plurality of loops adapted to have a binding engagement with said tooth bar and also with the notch formed in said tooth.

3. A harrow tooth fastener comprising a tooth bar of a substantially U-shape and provided with tooth openings, teeth fitting said openings and provided with a holding notch, and a resilient fastener fitting said holding bar behind the teeth and provided with means for effecting a binding engagement with said tooth bar and also with the holding notches in the teeth.

4. A harrow tooth fastener comprising a tooth bar of substantially U-shape and provided with upper and lower registering tooth openings, a tooth fitting said openings and provided with a holding notch, and a resilient fastener fitting within said tooth bar and provided with upper and lower loops adapted for engagement with said tooth bar, and an intermediate loop adapted for engagement with the holding notch of said tooth.

5. A harrow tooth fastener comprising a tooth bar of substantially U-shape and provided with upper and lower openings for the reception of teeth, teeth fitting said openings and provided with holding notches in their body portion within said tooth bar, a substantially W-shaped fastener fitting said tooth bar and providing upper and lower rearwardly projecting loops the rounded ends of which have a binding engagement with the corners of said tooth bar, and an intermediate rounded-end loop which projects forwardly and is adapted to have a binding engagement with the holding notch of each tooth.

In testimony whereof I hereunto affix my signature in presence of two witnesses.

JOHN A. JOHNSON.

Witnesses:
 J. O'B. SCOBEY,
 A. B. KINNEY.